(12) United States Patent
Bockus

(10) Patent No.: US 7,996,784 B2
(45) Date of Patent: Aug. 9, 2011

(54) METHOD AND APPARATUS FOR CONTROLLING TAB INDEXES IN A WEB PAGE

(75) Inventor: Michael Andrew Bockus, Manor, TX (US)

(73) Assignee: International Business Machines Corporation, Armonk, NY (US)

( * ) Notice: Subject to any disclaimer, the term of this patent is extended or adjusted under 35 U.S.C. 154(b) by 557 days.

(21) Appl. No.: 11/609,227

(22) Filed: Dec. 11, 2006

(65) Prior Publication Data

US 2008/0141162 A1   Jun. 12, 2008

(51) Int. Cl.
G06F 3/048 (2006.01)

(52) U.S. Cl. ......... 715/777; 715/744; 715/747; 715/765

(58) Field of Classification Search .................. 715/777, 715/738–749, 765–767
See application file for complete search history.

(56) References Cited

U.S. PATENT DOCUMENTS

| | | | | |
|---|---|---|---|---|
| 5,510,811 | A * | 4/1996 | Tobey et al. .................. | 345/157 |
| 5,544,299 | A * | 8/1996 | Wenstrand et al. ........... | 715/804 |
| 5,721,897 | A * | 2/1998 | Rubinstein ............................ | 1/1 |
| 5,796,404 | A * | 8/1998 | Gentner ........................ | 715/823 |
| 5,963,205 | A * | 10/1999 | Sotomayor .................... | 715/236 |
| 5,999,948 | A * | 12/1999 | Nelson et al. ................. | 715/207 |
| D427,575 | S * | 7/2000 | Coleman ...................... | D14/489 |
| 6,114,978 | A * | 9/2000 | Hoag ............................. | 341/23 |
| 6,229,539 | B1 * | 5/2001 | Morcos et al. ................ | 715/808 |
| D453,937 | S * | 2/2002 | Wasko et al. ................. | D14/487 |
| D461,821 | S * | 8/2002 | Lindsay et al. ............... | D14/487 |
| 6,452,611 | B1 * | 9/2002 | Gerba et al. ................... | 715/721 |
| 6,489,976 | B1 * | 12/2002 | Patil et al. ...................... | 715/827 |
| D469,444 | S * | 1/2003 | Ording et al. ................. | D14/487 |
| 6,606,106 | B1 * | 8/2003 | Mendenhall et al. ......... | 715/854 |
| 6,643,824 | B1 * | 11/2003 | Bates et al. .................... | 715/205 |
| 6,654,038 | B1 * | 11/2003 | Gajewska et al. ............. | 715/802 |
| 6,691,155 | B2 * | 2/2004 | Gottfried ....................... | 709/204 |
| D490,440 | S * | 5/2004 | Ording et al. ................. | D14/487 |
| 6,850,255 | B2 * | 2/2005 | Muschetto .................... | 715/788 |
| 6,874,130 | B1 * | 3/2005 | Baweja et al. ................. | 715/805 |
| 6,918,090 | B2 * | 7/2005 | Hesmer et al. ................ | 715/760 |
| 7,007,281 | B2 * | 2/2006 | Gajewska et al. ............. | 719/318 |
| 7,111,243 | B1 * | 9/2006 | Ballard et al. ................. | 715/744 |
| 7,134,089 | B2 * | 11/2006 | Celik et al. .................... | 715/767 |

(Continued)

OTHER PUBLICATIONS

Kyrnin, "Tabindex: Making Your Pages Accessible" Your Guide to Web Design/HTML, retrieved Nov. 20, 2006, pp. 1-2. http://webdesign.about.com/od/usability/a/aa071105.htm.

*Primary Examiner* — Ba Huynh
(74) *Attorney, Agent, or Firm* — Matthew W. Baca; Amy J. Pattillo

(57) ABSTRACT

A computer implemented method, apparatus, and computer usable program code for managing tab indexes. A Web page is displayed, wherein the Web page includes a plurality of tab indexes for a plurality of components in the Web page. User input is received for setting a position for a tab index within the plurality of tab indexes for a component within the plurality of components in the Web page relative to positions of tab indexes for other components within the plurality of tab indexes in the Web page to form a desired position for the tab index. The desired position is stored for the tab index for the component to form stored tab index information. Subsequent visits to the Web page result in the tab index for the component being in the desired position using the stored tab index information.

6 Claims, 5 Drawing Sheets

U.S. PATENT DOCUMENTS

| | | | |
|---|---|---|---|
| 7,216,298 B1* | 5/2007 | Ballard et al. | 715/760 |
| 7,219,304 B1* | 5/2007 | Kraenzel et al. | 715/755 |
| 7,243,309 B2* | 7/2007 | Koay et al. | 715/827 |
| 7,263,662 B1* | 8/2007 | Ballard et al. | 715/762 |
| 7,263,663 B2* | 8/2007 | Ballard et al. | 715/762 |
| 7,379,965 B2* | 5/2008 | Sherwood et al. | 709/203 |
| 7,379,977 B2* | 5/2008 | Walrath | 709/219 |
| 7,437,672 B2* | 10/2008 | Myers | 715/719 |
| 7,568,004 B2* | 7/2009 | Gottfried | 709/204 |
| 7,603,657 B2* | 10/2009 | Gassner et al. | 717/113 |
| 7,620,886 B1* | 11/2009 | Young | 715/203 |
| 7,631,278 B2* | 12/2009 | Miksovsky et al. | 715/857 |
| 7,636,897 B2* | 12/2009 | Koralski et al. | 715/767 |
| 7,685,234 B2* | 3/2010 | Gottfried | 709/204 |
| 7,707,505 B1* | 4/2010 | Ohrt et al. | 715/738 |
| 2003/0023670 A1* | 1/2003 | Walrath | 709/203 |
| 2003/0073064 A1* | 4/2003 | Riggs | 434/350 |
| 2003/0137538 A1* | 7/2003 | Hesmer et al. | 345/760 |
| 2003/0227487 A1* | 12/2003 | Hugh | 345/777 |
| 2004/0090463 A1* | 5/2004 | Celik et al. | 345/767 |
| 2004/0205497 A1* | 10/2004 | Alexander et al. | 715/501.1 |
| 2005/0015730 A1* | 1/2005 | Gunturi et al. | 715/777 |
| 2005/0039127 A1* | 2/2005 | Davis | 715/708 |
| 2005/0160065 A1 | 7/2005 | Seeman | |
| 2005/0172237 A1* | 8/2005 | Cragun et al. | 715/744 |
| 2006/0117267 A1* | 6/2006 | Koralski et al. | 715/767 |
| 2006/0271861 A1* | 11/2006 | Yolleck et al. | 715/760 |
| 2007/0022367 A1* | 1/2007 | Ingrassia et al. | 715/501.1 |
| 2008/0120322 A1* | 5/2008 | Liu et al. | 707/102 |
| 2008/0201646 A1* | 8/2008 | Cragun et al. | 715/744 |

* cited by examiner

```
<html>
<head>
<title>Custom Tab Index Page</title>
</head>
<body>
        <div id="linkdiv">
                <a href="http://ibm.com" id="ibmlink">IBM</a><br/>            ╱⎺602
                <a href="http://ibm.com/systems/i" id="systemilink">System i</a><br/>   ╱⎺604
                <a href="http://ibm.com/systems/p" id="systemplink">System p</a><br/>   ╱⎺606
                <a href="http://ibm.com/systems/unix" id="unixlink">Unix Systems</a><br/><br/>   ╱⎺608
        </div>
        <div id="logindiv">
                <form action="/login.action" method="POST">
                        Name: <br/><input type="text" id="namefield"><br/>   ╱⎺610
                        Password: <br/><input type="password" id="passfield"><br/>
                        <input type="submit" value="Submit">
                </form>
        </div>
</body>
</html>
```

*FIG. 6*

```
<html>
<head>
<title>Custom Tab Index Page</title>
</head>
<body>
        <div id="linkdiv">
                <a href="http://ibm.com" id="ibmlink">IBM</a><br/>            ╱⎺602
                <a href="http://ibm.com/systems/i" id="systemilink">System i</a><br/>   ╱⎺604
                <a href="http://ibm.com/systems/p" id="systemplink">System p</a><br/>   ╱⎺606
                <a href="http://ibm.com/systems/unix" id="unixlink">Unix Systems</a><br/><br/>   ╱⎺608
        </div>
        <div id="logindiv">
                <form action="/login.action" method="POST">
                        Name: <br/><input type="text" id="namefield" tabindex="1"><br/>   ╱⎺700
                        Password: <br/><input type="password" id="passfield"><br/>
                        <input type="submit" value="Submit">
                </form>
        </div>
</body>
</html>
```

*FIG. 7*

METHOD AND APPARATUS FOR CONTROLLING TAB INDEXES IN A WEB PAGE

BACKGROUND OF THE INVENTION

1. Field of the Invention

The present invention relates generally to an improved data processing system, and in particular to a method and apparatus for processing Web pages. Still more particularly, the present invention relates to a computer implemented method, apparatus, and computer usable program code for managing tab indexes in a Web page.

2. Description of the Related Art

The Internet is a global network of computers and networks joined together by means of gateways that handle data transfer and the conversion of messages from a protocol of the sending network to a protocol used by the receiving network. On the Internet, any computer may communicate with any other computer with information traveling over the Internet through a variety of languages, also referred to as protocols. The set of protocols used on the Internet is called Transmission Control Protocol/Internet Protocol (TCP/IP).

The Internet has revolutionized both communications and commerce, as well as being a source of both information and entertainment. For many users, email is a widely used format to communicate over the Internet. Additionally, the Internet is also used for real-time voice conversations.

With respect to transferring data over the Internet, the World Wide Web environment is used. This environment is also referred to simply as "the Web". The Web is a mechanism used to access information on the Internet. In the Web environment, servers and clients effect data transactions using the hypertext transfer protocol (HTTP), a known protocol for handling the transfer of various data files, such as text files, graphic images, animation files, audio files, and video files.

On the Web, the information in various data files is formatted for presentation to a user by a standard page description language, the hypertext markup language (HTML). Documents using HTML are also referred to as Web pages. Web pages are connected to each other through links or hyperlinks. These links allow for a connection or link to other Web resources identified by a universal resource identifier (URI), such as a uniform resource locator (URL).

A browser is a program used to look at and interact with all of the information on the Web. A browser is able to display Web pages and to traverse links to other Web pages. Resources, such as Web pages, are retrieved by a browser, which is capable of submitting a request for the resource. This request typically includes an identifier, such as, for example, a URL. As used herein, a browser is an application used to navigate or view information or data in any distributed database, such as the Internet or the World Wide Web. A user may enter a domain name through a graphical user interface (GUI) for the browser to access a source of content. The domain name is automatically converted to an IP address by a domain name system (DNS), which is a service that translates the symbolic name entered by the user into an IP address by looking up the domain name in a database.

When navigating through a Web page, a user may scroll through and select components within the Web page, such as links, by using a pointing device, such as a mouse, a keyboard, or a trackball. Additionally, a user may move through different components in a Web page using a tab function. Web pages are often designed to allow for the setting of tab indexes for different components on a Web page. If the tab indexes are set, the user is able to use the tab function to sequentially move through different components from the beginning to the end of the Web page based on the order set by the designer of the Web page.

This type of feature is convenient for users to quickly move from link to link or field to field in a Web page. However, this type of feature may be annoying to a user who is attempting to focus on a particular field such as a login input field, by causing the user to tab through numerous other components, such as links, to reach the login input field.

SUMMARY OF THE INVENTION

The illustrative embodiments provide a computer implemented method, apparatus, and computer usable program code for managing tab indexes. A Web page is displayed, wherein the Web page includes a plurality of tab indexes for a plurality of components in the Web page. User input is received for setting a position for a tab index within the plurality of tab indexes for a component within the plurality of components in the Web page relative to positions of tab indexes for other components within the plurality of tab indexes in the Web page to form a desired position for the tab index. The desired position is stored for the tab index for the component to form stored tab index information. Subsequent visits to the Web page result in the tab index for the component being in the desired position using the stored tab index information.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a diagram illustrating code for a custom tab index page in accordance with an illustrative embodiment;

FIG. 7 is a diagram illustrating code for a custom tab index page in accordance with an illustrative embodiment;

DETAILED DESCRIPTION OF THE PREFERRED EMBODIMENT

Figure 1:
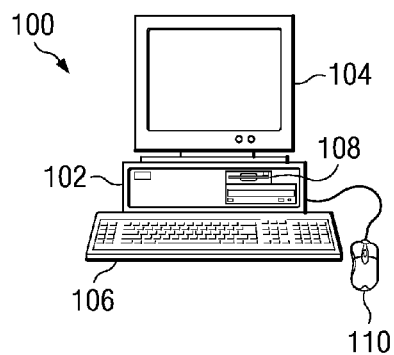
FIG. 1 is a pictorial representation of a data processing system in which illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices include a joystick, a touchpad, a touch screen, a trackball, a microphone, and the like.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
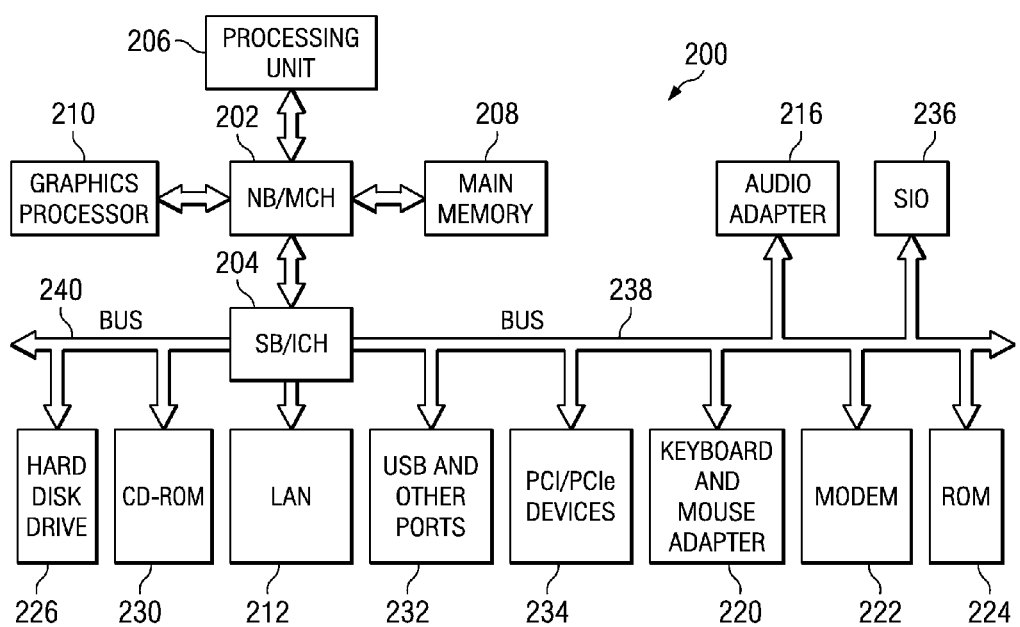
FIG. 2 is a block diagram of a data processing system in which illustrative embodiments may be implemented.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, and universal serial bus (USB) and other communications ports 232. PCI/PCIe devices 234 are coupled to south bridge and I/O controller hub 204 through bus 238. Hard disk drive (HDD) 226 and CD-ROM drive 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200 in FIG. 2. The operating system may be a commercially available operating system, such as Microsoft® Windows XP®. Microsoft® and Windows XP® are trademarks of Microsoft Corporation in the United States, other countries, or both. An object-oriented programming system, such as the Java™ programming system, may run in conjunction with the operating system and provides calls to the operating system from Java™ programs or applications executing on data processing system 200. Java™ and all Java-based trademarks are trademarks of Sun Microsystems, Inc. in the United States, other countries, or both.

Instructions for the operating system, the object-oriented programming system, and applications or programs are located on storage devices, such as hard disk drive 226. These instructions may be loaded into main memory 208 for execution by processing unit 206. The processes of the illustrative embodiments may be performed by processing unit 206 using computer implemented instructions, which may be located in a memory. An example of a memory is main memory 208, read only memory 224, or one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, a laptop computer, or a telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

The illustrative embodiments provide a computer implemented method, apparatus, and computer usable program code for managing tab indexes in a Web page. A Web page is displayed in which the Web page includes tab indexes for components within the Web page. User input is received, setting a position for a tab index for a particular component in the Web page. This position is set relative to the positions for other tab indexes for the other components in the Web page to form a desired position for the tab index. This desired position is stored to form a stored tab index.

Subsequent visits to the Web page result in a tab index being reached in the desired position using the stored position information. For example, a user may wish to set a login field for a Web page as the first tab index. In this manner, the tab index for the login field is changed to become the first component reached when the tab function is used. This tab information is stored. When the Web page is retrieved at a later time, the stored tab information is used to replace the tab information in the Web page to allow the user to reach the login field first when using a tab function.

Figure 3:
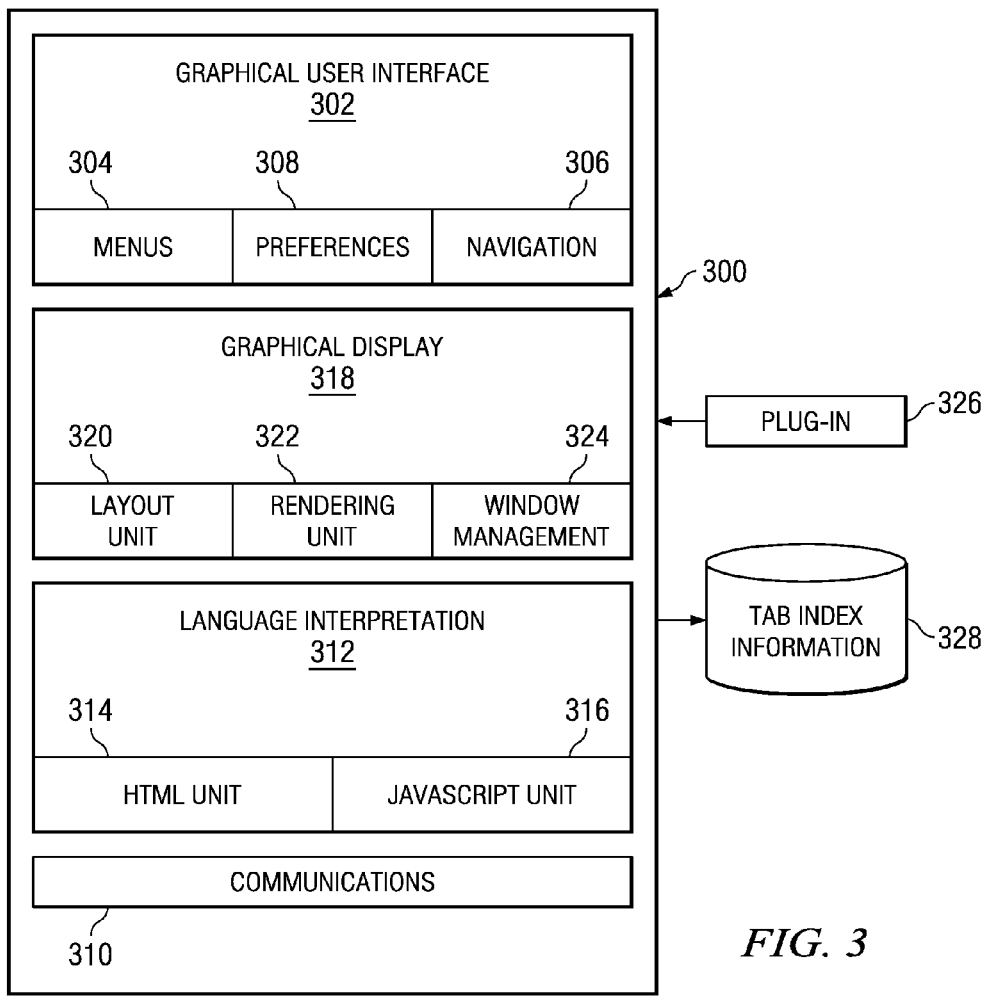
FIG. 3 is a block diagram of a browser program in accordance with an illustrative embodiment.

Turning next to FIG. 3, a block diagram of a browser program is depicted in accordance with an illustrative embodiment. A browser is an application used to navigate or view information or data in a distributed database, such as the Internet or the World Wide Web.

In this example, browser 300 includes a user interface 302, which is a graphical user interface (GUI) that allows the user to interface or communicate with browser 300. This interface provides for selection of various functions through menus 304 and allows for navigation through navigation 306. For example, menus 304 may allow a user to perform various functions, such as saving a file, opening a new window, displaying a history, and entering a URL. Navigation 306 allows a user to navigate various pages and to select Web sites for viewing. For example, navigation 306 may allow a user to see a previous page or a subsequent page relative to the present page. Preferences such as those illustrated in FIG. 3 may be set through preferences 308.

Communications 310 is the mechanism with which browser 300 receives documents and other resources from a network such as the Internet. Further, communications 310 is used to send or upload documents and resources onto a network. In the depicted example, communications 310 uses HTTP. Other protocols may be used depending on the implementation. Documents that are received by browser 300 are processed by language interpretation 312, which includes an HTML unit 314 and a JavaScript unit 316. Language interpretation 312 will process a document for presentation on graphical display 318. In particular, HTML statements are processed by HTML unit 314 for presentation while JavaScript statements are processed by JavaScript unit 316.

Graphical display 318 includes layout unit 320, rendering unit 322, and window management 324. These units are involved in presenting Web pages to a user based on results from language interpretation 312.

Browser 300 is presented as an example of a browser program in which illustrative embodiments may be embodied. Browser 300 is not meant to imply architectural limitations to the present invention. Presently available browsers may include additional functions not shown or may omit functions shown in browser 300. A browser may be any application that is used to search for and display content on a distributed data processing system. Browser 300 may be implemented using known browser applications, such as Netscape Navigator or Microsoft Internet Explorer. Netscape Navigator is available from Netscape Communications Corporation, while Microsoft Internet Explorer is available from Microsoft Corporation.

In these illustrative examples, the tab setting features in the illustrative embodiments may be implemented in language interpretation 312. In particular, the different features may be implemented using HTML unit 314. Alternatively, the different features may be implemented in part or in whole within plug-in 326. A plug-in is a program that interacts with a main application, such as browser 300. Typically, plug-ins add functionality to the main program.

In these examples, graphical user interface 302 serves to provide a dialog, such as a pop-up dialog, to allow the user to select an index number when the user desires to change the order in which components are reached when using a tab function. HTML unit 314 or plug-in 326 receives the information setting a tab position for a selected component through graphical user interface 302. This information is then stored in tab index information 328 in association with an identification of the Web page. As a result, when the Web page is subsequently retrieved, HTML unit 314 or plug-in 326 replaces the tab index information for the HTML component with the desired one in tab index information 328.

In particular, the user may click on the desired HTML component and select an option to select the tab index. This user input presents the pop-up dialog to set the tab index number for the component. The identification and name of the component of the tab index being set is stored in tab index information 328.

Figure 4:
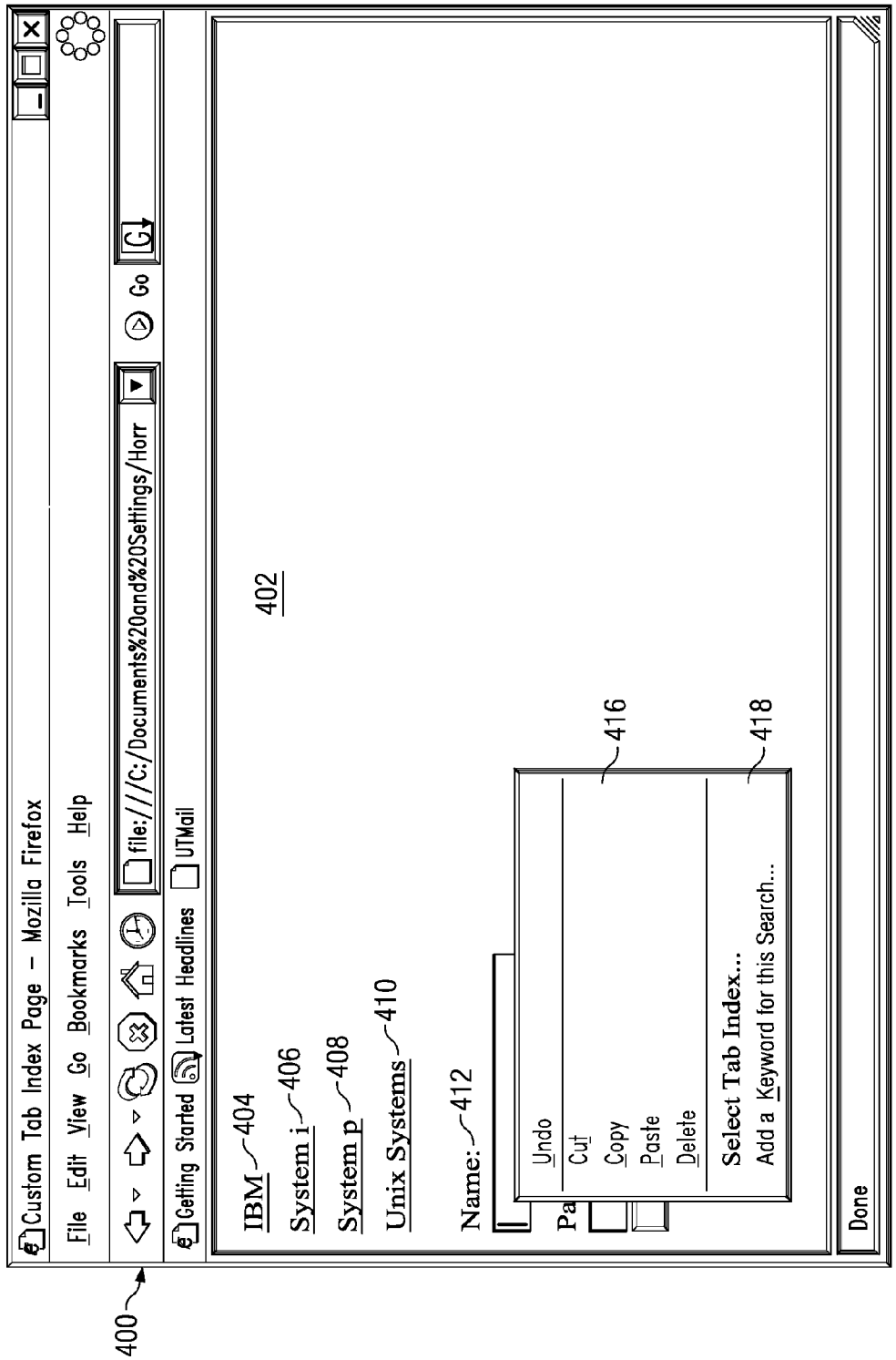
FIG. 4 is a diagram illustrating a user interface for setting index tabs in accordance with an illustrative embodiment.

Turning now to FIG. 4, a diagram illustrating a user interface for setting index tabs is depicted in accordance with an illustrative embodiment. The interface illustrated in FIG. 4 may be implemented in browser 300 in FIG. 3. In particular, the user interface may be part of graphical user interface 302 in FIG. 3.

Window 400 illustrates a graphical user interface for a browser, such as browser 300 in FIG. 3. In this particular example, page 402 is displayed within window 400. A user may tab through various components in Web page 402. In these examples, links 404, 406, 408, and 410 are present. Thereafter, name field 412 is illustrated. A user employing a tab function would sequentially move through links 404, 406, 408, and 410 before reaching name field 412. This organization of components in page 402 requires the user to tab five times before reaching name field 412. With the different illustrative embodiments, the user may, at name field 412, right-click on a mouse to cause menu 416 to be displayed. The user may then select menu item 418 to set a tab index for name field 412 to change the order in which components on page 402 are reached using a tab function.

Figure 5:
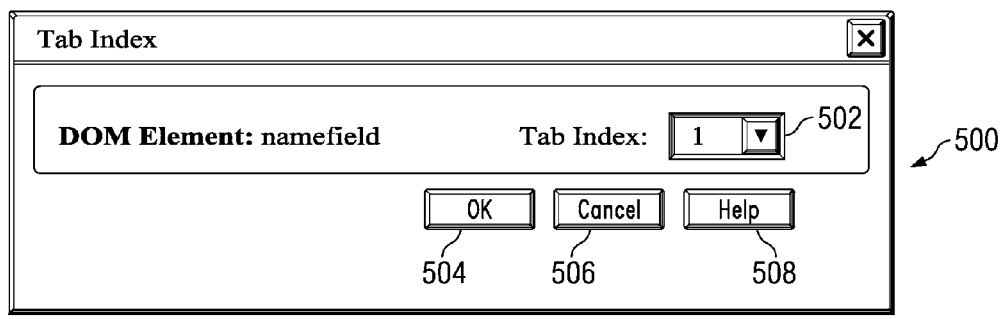
FIG. 5 is a diagram illustrating a user interface for setting index tabs in accordance with an illustrative embodiment.

Turning now to FIG. 5, a diagram illustrating a user interface for setting index tabs is depicted in accordance with an illustrative embodiment. In this example, panel 500 is an example of a user interface that is presented when menu item 418 in FIG. 4 is selected. In this example, panel 500 includes control 502, which allows the user to select the tab index number for the component on the Web page. In this example, control 502 is used to select a tab index "1" for the component. After the user has selected the appropriate tab index setting, the user may select "OK" button 504 to store the information. If the user does not wish to set the tab index, the user may select "cancel" button 506. "Help" button 508 may be selected to obtain more information about setting the tab index using control 502 in these examples.

By setting a tab index of "1" using control 502 for name field 412 in FIG. 4, name field 412 will be the first component reached when the tab function is used upon a subsequent retrieval of page 402.

Turning now to FIG. 6, a diagram illustrating code for a custom tab index page is depicted in accordance with an illustrative embodiment. In this example, code 600 is an example of XTML code in which tabs are set for different components in a Web page. Code 600 illustrates a code that presents a Web page similar to page 402 in FIG. 4. In these examples, the different components are reached using a tab function based on the order in which the codes are listed in code 600. For example, line 602 corresponds to link 404; line 604 corresponds to link 406; line 606 corresponds to link 408; line 608 corresponds to link 410; and line 610 corresponds to name field 412 in FIG. 4.

Turning now to FIG. 7, a diagram illustrating code for a custom tab index page is depicted in accordance with an illustrative embodiment. Line 700 is a modified version or replacement for line 610 in FIG. 6. In this example, line 700 has the name field set equal to a tab index of "1". With this setting, this field is reached first when a tab function is used in displaying a Web page. The other lines do not have tab setting numbers and are reached in the order that they are found in code 600 in FIG. 6. Alternatively, each of these fields may have tab index numbers. In that case, the tab index numbers may have been reordered to accommodate setting name field 412 in FIG. 4 to a tab index of "1".

Figure 8:
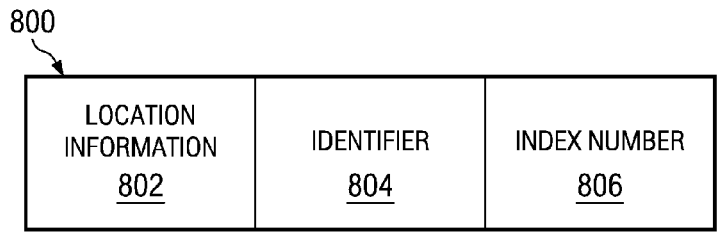
FIG. 8 is a diagram illustrating tab index information in accordance with an illustrative embodiment.

With reference now to FIG. 8, a diagram illustrating tab index information is depicted in accordance with an illustrative embodiment. Entry 800 is an example of tab index information that may be stored in tab index information 328 in FIG. 3. Entry 800 may contain information derived from XTML code, such as code 700 in FIG. 7. In particular, entry 800 includes location information 802, identifier 804, and index number 806. Location information 802 is an identification of the location of the Web page. In these examples, location information 802 is a universal resource locator. Identifier 804 is information used to identify the component in the Web page. Index number 806 identifies the position of the component relative to other components. In these examples, identifier 804 and index number 806 may be derived from HTML code, such as that found in line 700 in FIG. 7.

For example, if index number 806 is set equal to one, the component for entry 800 will be the first component reached when the tab function is used. When a Web page is again retrieved, the process changes the index number for this component in the Web page to one even though its index number may be some other number. The other components following this component are changed in position by increments of one. Of course, the tab settings for the other components could be reset in other ways depending on the particular implementation.

Figure 9:
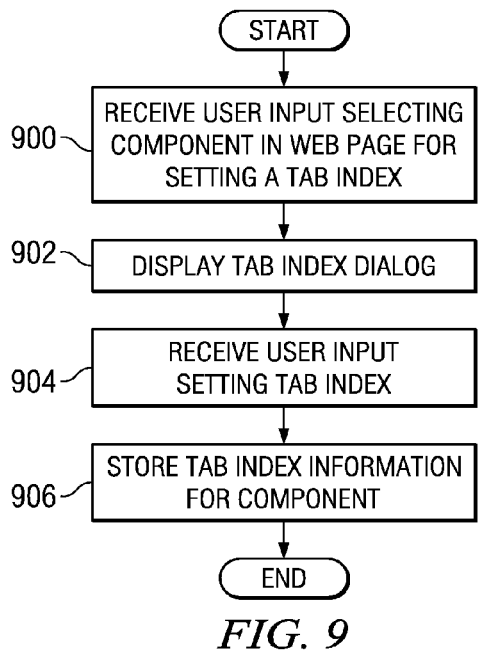
FIG. 9 is a flowchart of a process for setting a tab index number for a component in a Web page in accordance with an illustrative embodiment.

Turning now to FIG. 9, a flowchart of a process for setting a tab index number for a component in a Web page is depicted in accordance with an illustrative embodiment. The process illustrated in FIG. 9 may be implemented in a browser, such as browser 300 in FIG. 3. In particular, the process may be implemented using HTML unit 314 and/or plug-in 326.

The process begins by receiving a user input selecting a component in the Web page for setting a tab index (step 900). Thereafter, a tab index dialog is displayed (step 902). In these examples, the dialog may be displayed using graphical user interface 302 in FIG. 3. Next, user input is received setting the tab index for the component (step 904). The tab index information is then stored for the component (step 906). In these examples the tab index information may be stored in tab index information 328 in FIG. 3.

Figure 10:
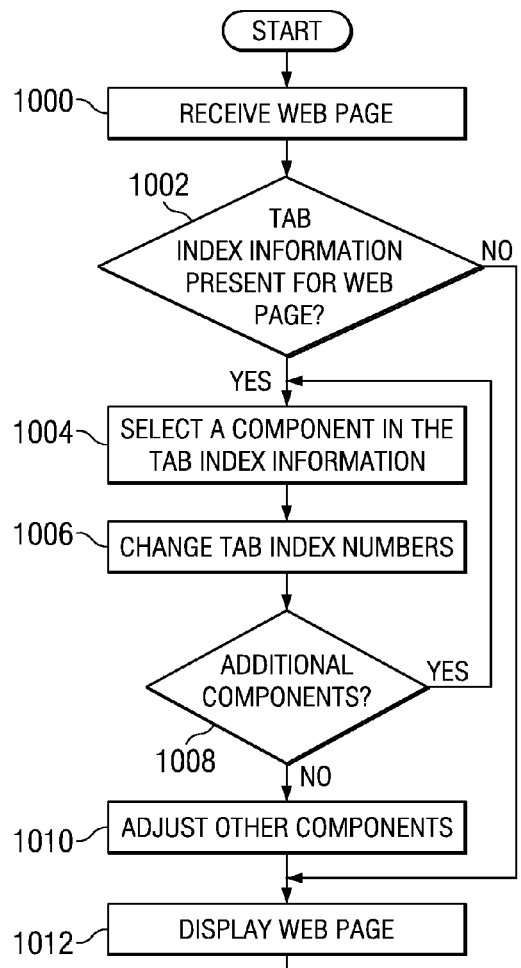
FIG. 10 is a flowchart of a process for processing a Web page in accordance with an illustrative embodiment.

Turning now to FIG. 10, a flowchart of a process for processing a Web page is depicted in accordance with an illustrative embodiment. The process illustrated in FIG. 10 may be implemented in browser 300. In particular, the processes may be implemented in HTML unit 314 and/or plug-in 326.

The process begins by receiving a Web page (step 1000). A determination is then made as to whether tab index information is present for the Web page (step 1002). The determination in step 1002 may be made by using the universal resource locator for the Web page and determining whether the universal resource locator is present in an entry for the tab index information. If tab index information is present for the Web page, a component in the tab index information is selected (step 1004). In some cases, more than one component may be set for a Web page. Thereafter, each tab index number for the selected component is changed (step 1006).

Thereafter, a determination is made as to whether additional components are present in the tab index information that have not yet been processed (step 1008). If additional components are present the process returns to step 1004 to select another component. Otherwise, the tab index numbers for other components that were not present in the tab index information are adjusted (step 1010).

In these examples, components following a component that has been set to a new tab index based on the tab index information are adjusted by changing those tab index numbers, if present, by increments of one in these examples. If the other components do not have tab index numbers set for them, those components are reached in the order they are found in the HTML code in these examples. Of course, if two components are present in which tab index numbers are set, the subsequent component does not have its tab index number adjusted in this step. Thereafter, the Web page is displayed (step 1012) with the process terminating thereafter.

With reference again to step 1002, if tab index information is not present for the Web page, no changes are needed. As a result, the process then proceeds to step 1012 as described above.

The flowcharts and block diagrams in the different depicted embodiments illustrate the architecture, functionality, and operation of some possible implementations of apparatus, methods and computer program products. In this regard, each block in the flowcharts or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the illustrative embodiments provide a computer implemented method for managing tab indexes for a Web page. The Web page is displayed in which the Web page includes tab indexes for components in the Web page. User input is received setting the position for the tab index within the indexes relative to the positions of tab indexes for other components. This set position forms a desired position for the tab index. The desired position for the tab index is stored to form stored tab index information. Subsequent visits to the Web page result in the tab index for the component being in the desired position using the stored tab index information.

In this manner, users are able to more efficiently use a tab function to reach desired components in a Web page. With this feature, a user may set one or more components in a Web page in an order as desired to reduce the amount of tabbing that a user has to perform to reach these components.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communication, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing tab indexes, the computer implemented method comprising:
    receiving, at a computer system, code for a Web page from a network location over a network comprising a plurality of components of the Web page wherein the order of the plurality of components listed in the code specifies the initial position information for an order of tab selection for a plurality of tab indexes for the plurality of components;
    displaying the Web page within a user interface;
    responsive to receiving a user input of a selection of a component within the plurality of components within the Web page and a menu selection input, displaying a menu within the user interface comprising a plurality of selectable functions for application to the component, wherein the plurality of selectable functions comprises a selectable tab index function to set a tab index for the component;
    responsive to receiving a second user input of a selection of the tab index function from within the menu, displaying a tab index user interface within a pop-up dialog within the user interface comprising a selectable panel comprising a plurality of selectable numbers each representing a separate tab index number from among a plurality of tab index numbers available for the Web page;
    responsive to receiving, a third user input of a particular number from among the plurality of selectable numbers, setting a desired position for a tab index within the plurality of tab indexes for a component within the plurality of components in the Web page relative to positions of tab indexes for other components within the plurality of tab indexes in the Web page to the particular number;
    changing the order of tab selection using the desired position;
    inserting a field into the code for the Web page for the component setting a tab index value for the component to the desired position;
    storing, by the computer system, the updated code for the Web page in association with an address for the network location of the Web page to form stored tab index information;
    responsive to the computer system retrieving the code for the Web page from the network location for a subsequent visit to the Web page after storing the desired position for the component as stored tab index information, retrieving the stored tab index information based on the address; and
    replacing initial position information for the tab index for the plurality of components within the retrieved Web page code with the stored tab index information, such that subsequent visits to the Web page result in the tab index for the component being in the desired position using the stored tab index information.

2. The computer implemented method of claim 1, wherein the component is a link to another web page location and wherein the field inserted into the code for the Web page comprises tab index field inserted with a particular line of the code specifying the link.

3. A computer program product comprising:
    a computer usable medium having computer usable program code for managing tab indexes, the computer usable program code executed by a processor for:
    receiving, at a computer system, code for a Web page from a network location over a network comprising a plurality of components of the Web page wherein the order of the plurality of components listed in the code specifies the initial position information for an order of tab selection for a plurality of tab indexes for the plurality of components;
    displaying the Web page within a user interface;
    responsive to receiving a user input of a selection of a component within the plurality of components within the Web page and a menu selection input, displaying a menu within the user interface comprising a plurality of selectable functions for application to the component, wherein the plurality of selectable functions comprises a selectable tab index function to set a tab index for the component;
    responsive to receiving a second user input of a selection of the tab index function from within the menu, displaying a tab index user interface within a pop-up dialog within the user interface comprising a selectable panel comprising a plurality of selectable numbers each representing a separate tab index number from among a plurality of tab index numbers available for the Web page;
    responsive to receiving, a third user input of a particular number from among the plurality of selectable numbers, setting a desired position for a tab index within the plurality of tab indexes for a component within the plurality of components in the Web page relative to positions of tab indexes for other components within the plurality of tab indexes in the Web page to the particular number;
    changing the order of tab selection using the desired position;
    inserting a field into the code for the Web page for the component setting a tab index value for the component to the desired position;

storing, by the computer system, the updated code for the Web page in association with an address for the network location of the Web page to form stored tab index information;

responsive to the computer system retrieving the code for the Web page from the network location for a subsequent visit to the Web page after storing the desired position for the component as stored tab index information, retrieving the stored tab index information based on the address; and replacing initial position information for the tab index for the plurality of components within the retrieved Web page code with the stored tab index information, such that subsequent visits to the Web page result in the tab index for the component being in the desired position using the stored tab index information.

4. The computer program product of claim 3, wherein the component is a link to another web page location and wherein the field inserted into the code for the Web page comprises tab index field inserted with a particular line of the code specifying the link.

5. A data processing system comprising:
a bus;
a communications unit connected to the bus;
a storage device connected to the bus, wherein the storage device includes computer usable program code; and
a processor unit connected to the bus, wherein the processor unit executes the computer usable program code to:
receive code for a Web page from a network location over a network comprising a plurality of components of the Web page wherein the order of the plurality of components listed in the code specifies the initial position information for an order of tab selection for a plurality of tab indexes for the plurality of components;
display the Web page within a user interface;
responsive to receiving a user input of a selection of a component within the plurality of components within the Web page and a menu selection input, display a menu within the user interface comprising a plurality of selectable functions for application to the component, wherein the plurality of selectable functions comprises a selectable tab index function to set a tab index for the component;
responsive to receiving a second user input of a selection of the tab index function from within the menu, display a tab index user interface within a pop-up dialog within the user interface comprising a selectable panel comprising a plurality of selectable numbers each representing a separate tab index number from among a plurality of tab index numbers available for the Web page;
responsive to receiving, a third user input of a particular number from among the plurality of selectable numbers, set a desired position for a tab index within the plurality of tab indexes for a component within the plurality of components in the Web page relative to positions of tab indexes for other components within the plurality of tab indexes in the Web page to the particular number;
change the order of tab selection using the desired position;
insert a field into the code for the Web page for the component setting a tab index value for the component to the desired position;
store the updated code for the Web page in association with an address for the network location of the Web page to form stored tab index information;
responsive to retrieving the code for the Web page from the network location for a subsequent visit to the Web page after storing the desired position for the component as stored tab index information, retrieve the stored tab index information based on the address; and
replace initial position information for the tab index for the plurality of components within the retrieved Web page code with the stored tab index information, such that subsequent visits to the Web page result in the tab index for the component being in the desired position using the stored tab index information.

6. The data processing system of claim 5, wherein the component is a link to another web page location and wherein the field inserted into the code for the Web page comprises tab index field inserted with a particular line of the code specifying the link.

* * * * *